(12) United States Patent
Kaneda

(10) Patent No.: US 6,417,883 B1
(45) Date of Patent: *Jul. 9, 2002

(54) MOVEMENT CORRECTING APPARATUS WITH SHIFTABLE IMAGE READ-OUT AREA

(75) Inventor: Kitahiro Kaneda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/045,081

(22) Filed: Mar. 20, 1998

Related U.S. Application Data

(63) Continuation of application No. 08/859,567, filed on May 20, 1997, now Pat. No. 5,739,857, which is a continuation of application No. 08/158,187, filed on Nov. 24, 1993, now abandoned, which is a continuation of application No. 07/650,758, filed on Jan. 5, 1991, now abandoned.

(30) Foreign Application Priority Data

Feb. 8, 1990 (JP) ............................................. 2-30674
Mar. 9, 1990 (JP) ............................................. 2-58765
Mar. 9, 1990 (JP) ............................................. 2-58766

(51) Int. Cl.$^7$ .............................................. H04N 5/232
(52) U.S. Cl. ..................................... 348/350; 348/347
(58) Field of Search ................................ 348/345, 347, 348/348, 349, 350, 352, 353, 354, 356, 358; 396/89, 103, 121, 124, 127

(56) References Cited

U.S. PATENT DOCUMENTS 4,812,912 A * 3/1989 Iida et al. .................... 348/346
4,872,058 A * 10/1989 Baba et al. .................. 348/352

* cited by examiner

Primary Examiner—Tuan Ho
(74) Attorney, Agent, or Firm—Robin, Blecker & Daley

(57) ABSTRACT

An image pick-up device capable of moving a detection region set on a picked-up picture by following the movement of an object image, wherein it is constructed to control a setting position of said detection region by detecting an object position on the picked-up picture, and further to control the moving range, response speed and size of said detection region, depending on the depth of field.

24 Claims, 8 Drawing Sheets

| FIG. 2A |
| FIG. 2B |

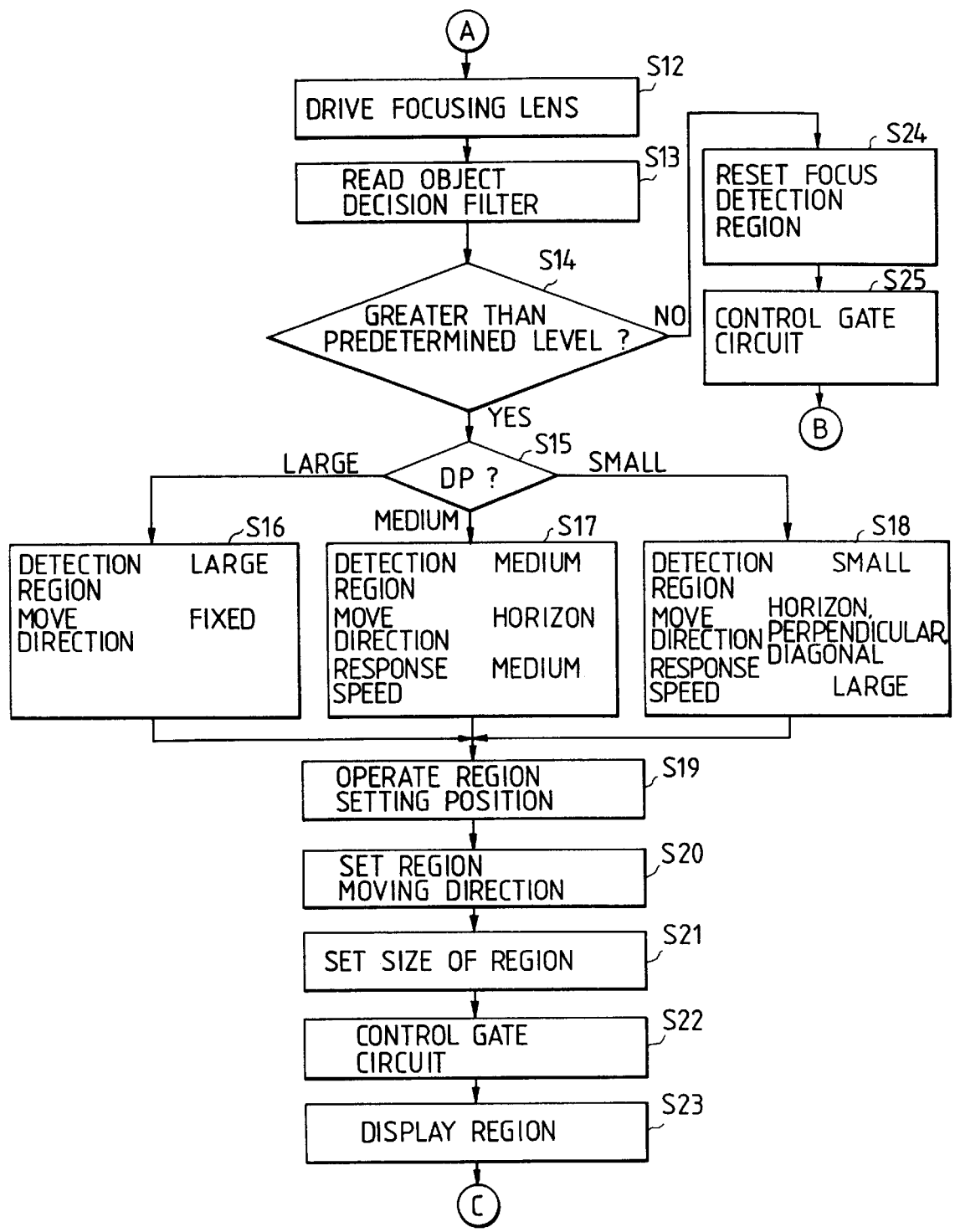

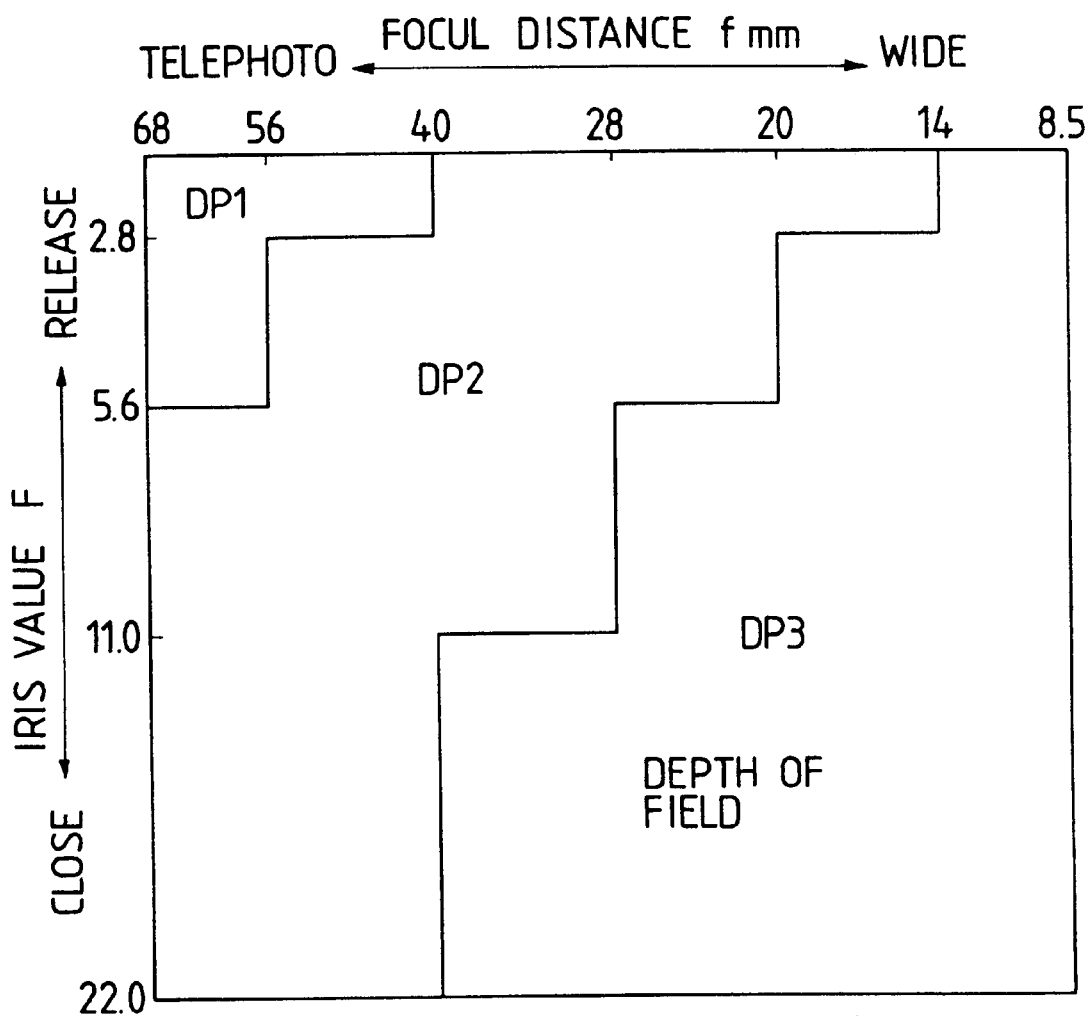

FIG. 6
| FIG. 6A |
| FIG. 6B |
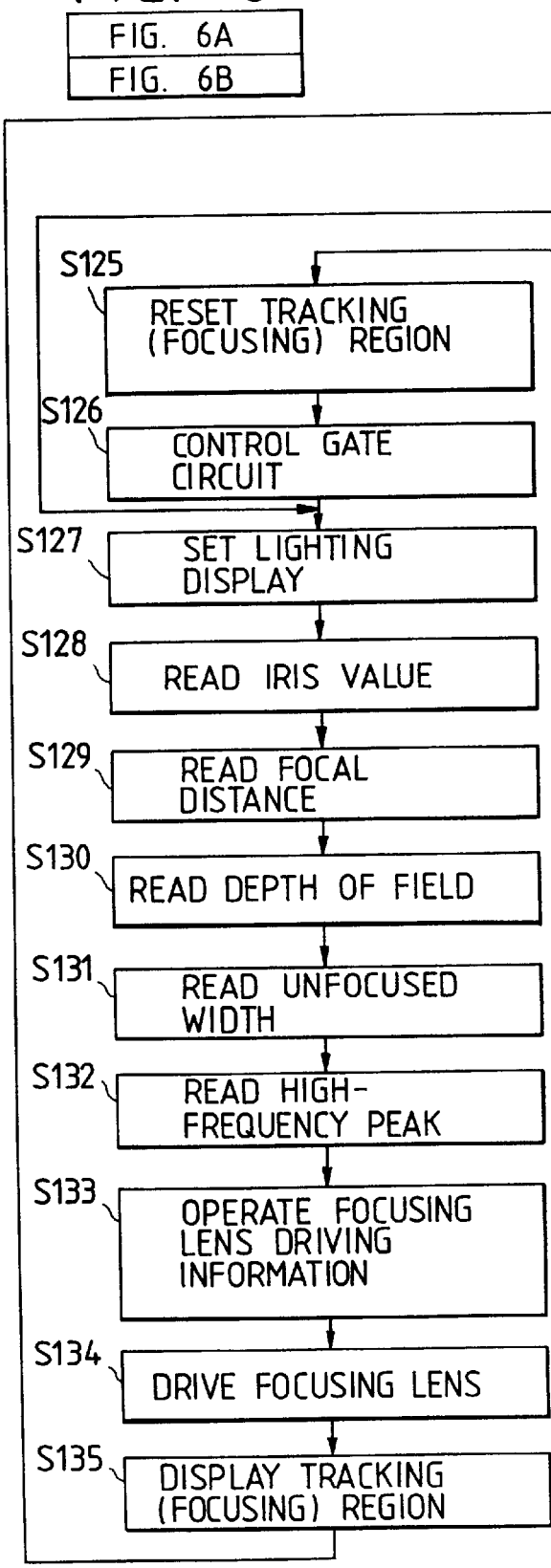
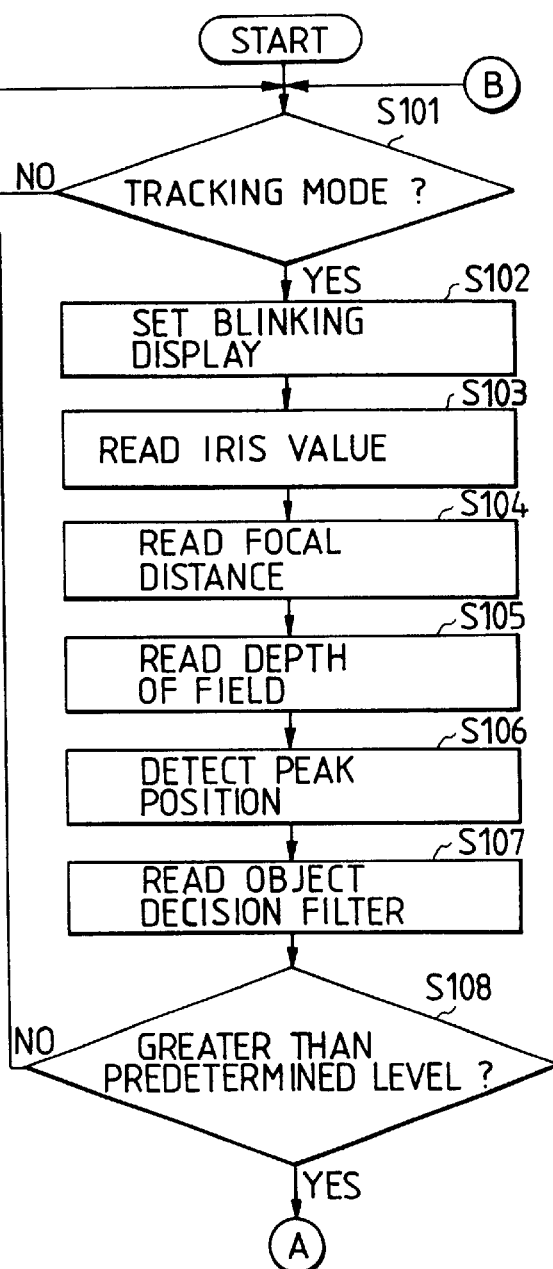

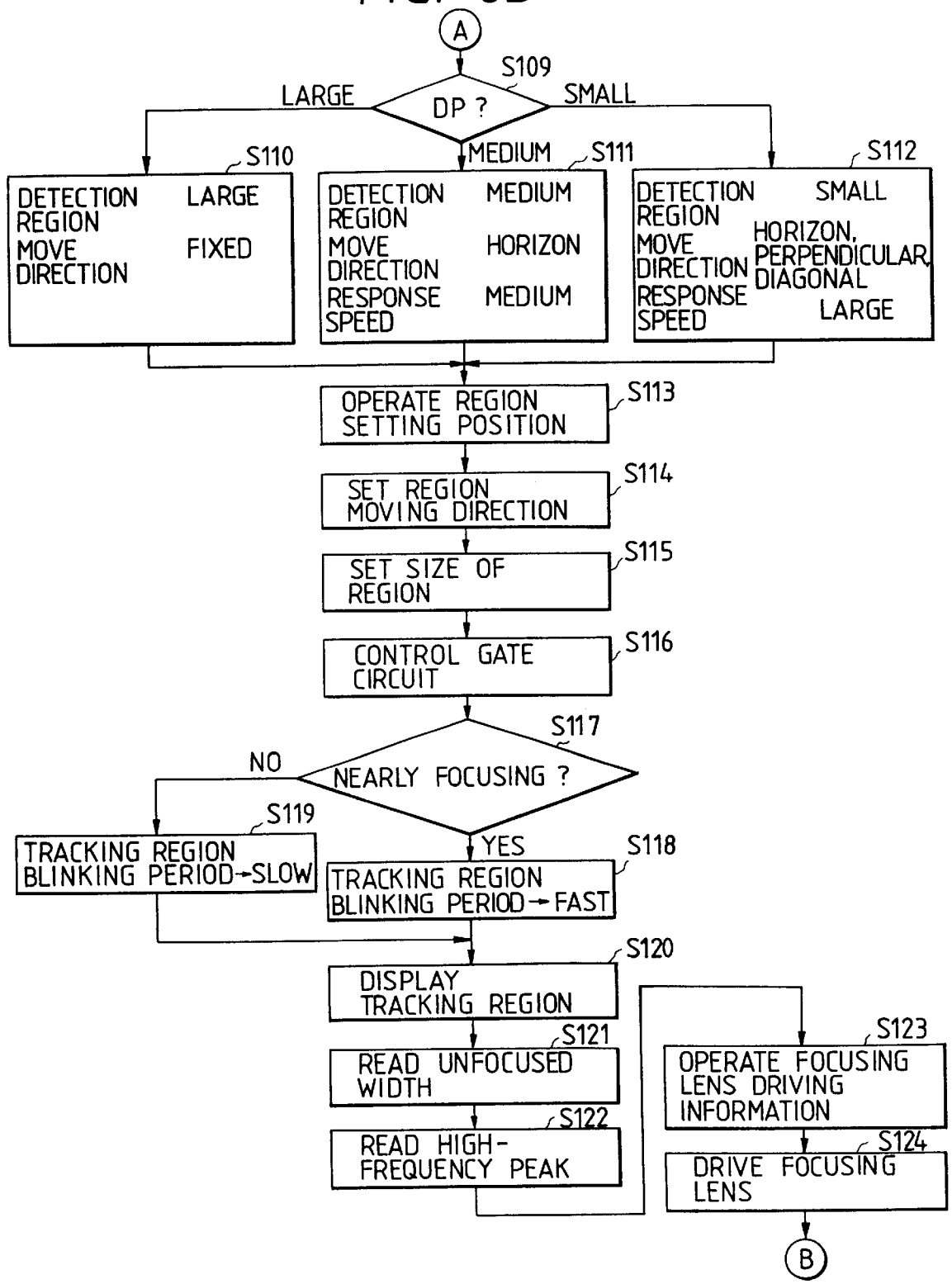

MOVEMENT CORRECTING APPARATUS WITH SHIFTABLE IMAGE READ-OUT AREA

CROSS-REFERENCE TO RELATED APPLICATIONS

This application is a continuation of application Ser. No. 08/859,567, filed May 20, 1997, now U.S. Pat. No. 5,739,857, which is a continuation of application Ser. No. 08/158,187, filed Nov. 24, 1993, now abandoned, which is a continuation of application Ser. No. 07/650,758, filed Feb. 5, 1991, now abandoned.

BACKGROUND OF THE INVENTION

1. Field of the Invention

The present invention relates to an automatic focusing device appropriate for use in a pick-up device, such as a video camera, a electronic still camera or the like.

2. Related Background Art

Conventionally, an image pick-up device such as a video camera is provided with a known method for focusing in which the focusing lens position is controlled by detecting the definition of an object image from the high-frequency component of a video signal which is output from pick-up means such as a CCD or the like, and making it maximum.

Further, in a camera converting an optical object image into an electric signal with such pick-up means, a method for the automatic focusing is proposed in which part of a picked-up picture is used as a focusing detection region, which is forced to follow the movement of the object to adjust into the focusing state automatically (e.g. Japanese Laid-Open Patent Application No. 60-249477.)

According to this conventional method, a move position of the object is obtained by sensing a characteristic point of the object within the focusing detection region and detecting the change thereof, and then the focusing detection region is reset on a small region centered on the move position.

However, since such a conventional pick-up device performs the tracking of an object with a focusing detection region of the same size and at the same response speed for every field in any of the pick-up situation, there occurs a problem that the focusing detection region may move unstably irrespectively of the object, for example, when the depth of field is large, in which it is difficult to distinguish a main object from the environment, i.e., background, in tracking the object to extract a peak of the high-frequency component of such object image (so-called a far and near contention).

SUMMARY OF THE INVENTION

It is a first objective of the present invention to resolve the above-mentioned problem by enabling the automatic object tracking adapted for a pick-up situation.

A second objective of the present invention is to provide an automatic object tracking device capable of tracking a moving object stably and reliably, whatever a pick-up situation may be.

A third objective of the present invention is to provide an automatic object tracking device capable of tracking a moving object precisely by controlling a moving range, response speed, moving direction, and size of the detection region, depending on the depth of field.

To accomplish these objectives, in accordance with a preferred embodiment of this invention, an image pick-up device capable of moving a detection region set on a picked-up picture by following the movement of an object image is disclosed, wherein the device comprises, position detection means for detecting an object position on said picked-up picture, region setting means for controlling a setting position of said detection region based on the output of said position detection means, and restriction means for restricting a moving range of said detection region according to a predetermined information of a pick-up state.

A fourth objective of the present invention is to provide an automatic focusing device capable of continuing to focus on a moving object, irrespective of the pick-up condition.

A fifth objective of the present invention is to provide an automatic focusing device capable of following an object image of interest, by making the movement of focusing detection region natural even when the depth of field is large.

To accomplish these objectives, in accordance with a preferred embodiment of this invention, an image pick-up device capable of moving a detection region set on a picked-up picture by following the movement of an object image is disclosed, wherein the device comprises position detection means for detecting an object position on said picked-up picture, region setting means for controlling a setting position of said detection region based on the output of said position detection means, and restriction means for restricting a moving range of said detection region according to an information of the depth of field.

A sixth objective of the present invention is to optimize the response characteristic to the tracking of an object, according to a pick-up condition.

To accomplish these objectives, in accordance with a preferred embodiment of this invention, an image pick-up device capable of moving a detection region set on a picked-up picture by following the movement of an object image is disclosed, wherein the device comprises position detection means for detecting an object position on said picked-up picture, region setting means for controlling a setting position of said detection region based on the output of said position detection means, and control means for controlling a response speed to the movement of said detection region according to an information of the depth of field.

A seventh objective of this invention is to provide a pick-up device capable of continuing to focus on a moving object, irrespective of the change of the depth of field.

To accomplish such an objective, in accordance with a preferred embodiment of this invention, an image pick-up device capable of moving a detection region set on a picked-up picture by following the movement of an object image is disclosed, wherein the device comprises position detection means for detecting an object position on said picked-up picture, region setting means for controlling a setting position of said detection region based on the output of said position detection means, and control means for controlling a moving direction, movement response speed, and size of said detection region according to an information of the depth of field.

An eighth objective of this invention is to provide an image pick-up device capable of performing a stable and reliable focusing operation for tracking an object, which permits the optimized control of a size, movement response speed, and moving direction of the focusing detection region at any time, irrespective of a pick-up condition, to enable the object to be positioned within the focusing detection region at all times.

A ninth objective of the present invention is to provide a pick-up device capable of continuing to focus on a moving object reliably, in which a main object is caught within a focusing detection region at any time, irrespective of the depth of field, with a stable and precise tracking of the object without malfunction such as a far and near contention, by switching and controlling appropriately the size, moving direction and response speed of the focusing detection region within a picked-up picture, depending on the depth of field.

A tenth object of the present invention is to provide a pick-up device with the automatic focusing adjustment having a mode of continuing to focus on a moving object while tracking the object, in which an operator can distinctly recognize a current mode of the focusing adjustment operation.

An eleventh object of the present invention is to provide a pick-up device capable of distinctly displaying on a monitor screen whether the current focusing detection mode is due to a fixed focusing detection region or a moving focusing detection region following the movement of an object, so that an operator can recognize a current focusing adjustment mode correctly, and various malfunctions and misoperations are prevented.

A twelfth objective of the present invention is to provide a focusing detection device capable of performing a stable and precise tracking of an object, by setting a first focusing detection mode in which the focusing operation is performed with the focusing detection region fixed at a predetermined position on a picked-up picture or a second focusing detection mode in which the focusing operation is performed with said detection region tracking the object, and in which said focusing detection region is displayed within a monitor screen, and further the current focusing detection mode, i.e., the on/off status of an automatic object tracking operation, is distinctly displayed within the monitor screen, as said first and second focusing detection modes have different displays for the focusing detection region, so that an operator can recognize a current pick-up condition correctly, and various malfunctions and misoperations can be prevented.

To accomplish these objectives, in accordance with a preferred embodiment of the present invention, an automatic focusing device is disclosed, in which the device comprises region setting means for setting a focusing detection region on a picked-up picture, object tracking means for controlling said region setting means by detecting the movement of an object image and moving a setting position of said focusing detection region by following said object image, focus control means for enabling the setting of a first focusing detection mode in which the focusing operation is performed with said focusing detection region fixed at a predetermined position on said picked-up picture, or a second focusing detection mode in which the focusing operation is performed with said detection region tracking the object, and display means for displaying said first focusing detection mode and said second focusing detection mode differently, as well as displaying said focusing detection region within a monitor screen.

A thirteenth objective of the present invention is to provide a pick-up device capable of distinctly displaying on a monitor screen such as an electronic view finder whether or not the current object tracking operation is performing a normal tracking of an object of interest, whereby an operator can recognize precisely the tracking operation condition in the current object tracking mode, and so various malfunctions and misoperations can be prevented.

Another objective of the present invention is to provide an automatic focusing device with the automatic object tracking feature enabling a stable and precise object tracking, which can continue to focus on a moving object by following the object, wherein the device can distinctly display on a monitor screen a state where the object tracking is normally performed to continue to focus on the moving object or a state where the object tracking is not normally performed so that the moving object is not focused on, because it is configured to display whether or not the object tracking operation is normally performed, with a decision from a condition of the focusing control system, whereby an operator can recognize precisely a current pick-up condition and various malfunctions and misoperations can be prevented.

To accomplish these objectives, in accordance with a preferred embodiment of the prevent invention, an automatic focusing device is disclosed, wherein the device comprises region setting means for setting a predetermined detection region on a picked-up picture, focusing detection means for detecting the focusing on an object image within said detection region, object tracking means for controlling said region setting means by detecting the movement of said object image and moving a setting position on said focusing detection region by following said object image, decision means for deciding an operation state of said object tracking means based on the output of said focusing detection means, and display means for displaying the operation state of said object tracking means based on a decision result from said decision means.

Other objectives and features of the present invention will become apparent from the following detailed description, in conjunction with the accompanying drawings.

BRIEF DESCRIPTION OF THE DRAWINGS

FIG. 3 is a view showing an operation table for the depth of field on the pick-up device according to the present invention.

FIG. 6 is a flowchart showing another example of the control operation of the pick-up device according to the present invention.

DETAILED DESCRIPTION OF THE PREFERRED EMBODIMENT

An automatic focusing device according to one embodiment of the present invention will now be described with reference to the drawings.

Figure 1:
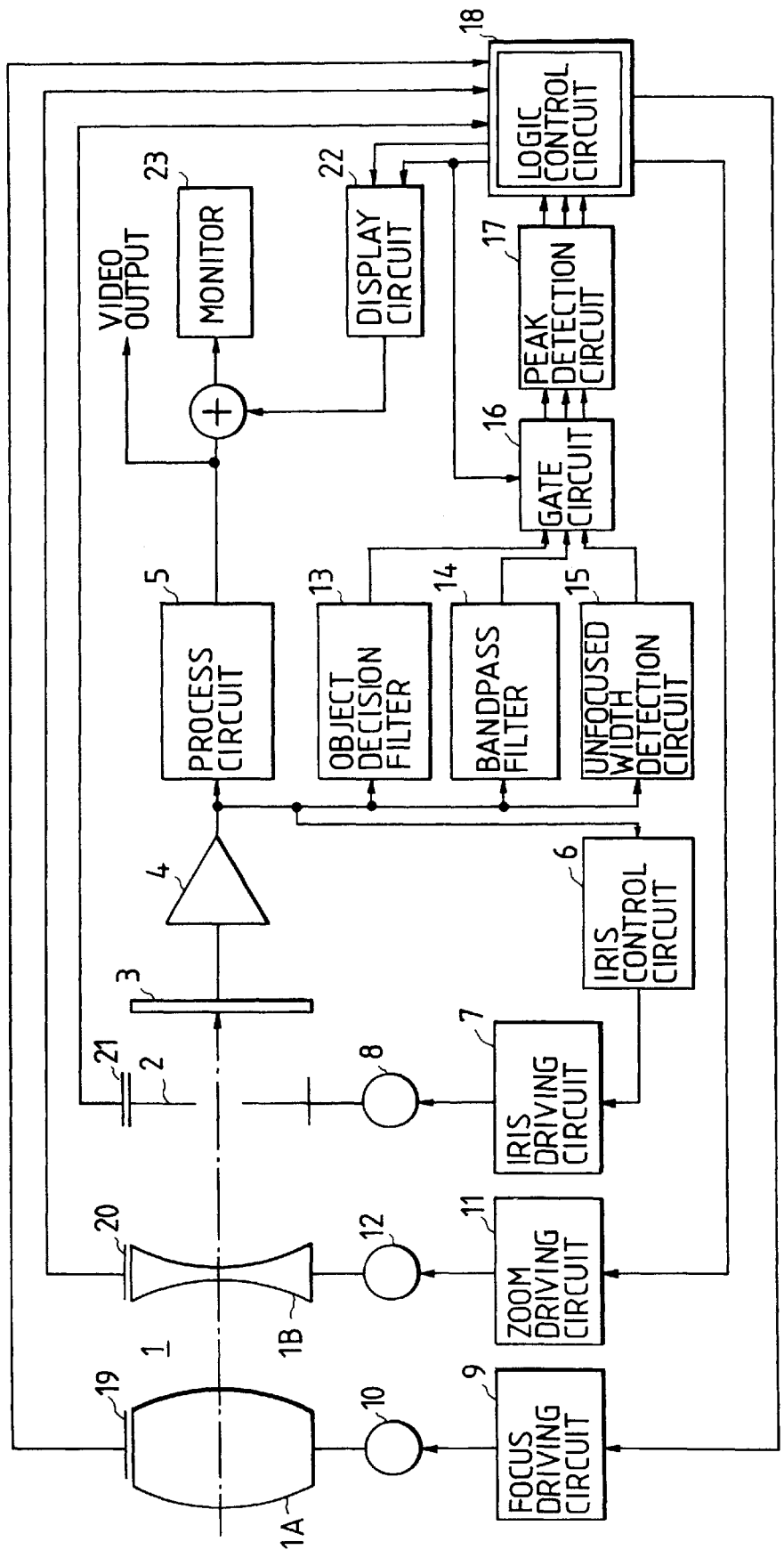
FIG. 1 is a block diagram showing a configuration of a pick-up device according to the present invention.

FIG. 1 is a block diagram showing an automatic focusing device of this invention applied to a video camera or the like.

In this figure, 1 indicates a pick-up lens system having a focusing lens 1A for adjusting a focus and a zoom lens 1B for performing the zoom operation. The focusing lens 1A is driven and controlled by means of a focusing motor driving circuit 9 and a focusing motor 10, while the zoom lens 1B is driven and controlled by means of a zoom motor driving circuit 11 and a zoom motor 12. 2 is an iris for controlling the amount of incident light, in which it is driven and controlled by means of an iris driving circuit 7 and an ig meter 8 for driving iris. 3 is a pick-up element such as CCD for photoelectrically converting an object image formed on a picked-up picture with the focusing lens 1 into a pick-up signal, 4 is a preamplifier for amplifying the pick-up signal that is output from the pick-up element 3 to a predetermined level, and 5 is a process circuit for converting an image signal that is output from the preamplifier 4 into a normalized standard television signal, with predetermined processings such as gamma correction, blanking processing and the addition of synchronizing signal, and outputting it from a video output terminal. The television signal output from the process circuit 5 is supplied to a monitor 23 such as a video recorder or electronic view finder not shown.

6 is an iris control circuit for automatically controlling the ig meter 8 via the iris driving circuit 7 such that the image signal output by the preamplifier 4 is input and the aperture size of the iris 2 is adjusted to maintain the level of said image signal constant at a predetermined level.

13 is a full-range filter set to be able to determine whether or not there is an object by determining whether the contrast of object is large or small from the image signal output by the preamplifier 4, 14 is a band-pass filter for extracting a high-frequency component necessary to detect the focusing also from the image signal output by the preamplifier 4, and 15 is an detection circuit for detecting an unfocused width (width between edge portions of object image) of object image from the image signal, in which it detects the focusing by using such a property that the closer the focusing state, the smaller the unfocused width of object image is. As a focusing detection method as such with the unfocused width detection circuit is known in Japanese Laid-Open Patent Application No. 62-103616, the detail therefor is omitted.

16 is a gate circuit for passing only a signal which falls within a specified region on the picked-up picture, by gating the output from the object decision filter 13, the band-pass filter 14 and the unfocused width detection circuit 15, in which only a portion of a video signal of one field corresponding to that within a specified region is passed, in accordance with a gate pulse supplied by a logic control circuit 18 as will be described later, thereby enabling the setting of a passage region for extracting the high-frequency component, i.e., a focusing detection region for performing the focusing detection, at any position within the picked-up picture (the focusing detection regions set on the picked-up picture are shown in FIG. 4 and the detail of each figure will be described later).

17 is a peak position detection circuit for detecting the horizontal and vertical positions within the picked-up picture where a peak value of the high-frequency component is obtained from the image signal corresponding to that within the focusing detection region that was extracted by the gate circuit 16. This peak position detection circuit outputs the horizontal and vertical coordinates of the peak position detected during one field period, by dividing the focusing detection region into a predetermined number of blocks in the horizontal and vertical directions, and detecting in which block the peak position detected during one field period is located.

19 is a focus encoder for detecting a move position of the focusing lens 1A, 20 is a zoom encoder for detecting an information of the focal distance changeable with the zoom lens 1B, and 21 is an iris encoder for detecting the amount of aperture for the iris 22. These detection data are supplied to the logic control section 18.

18 is a logic control circuit for controlling the entire system totally, for example, constructed of a microcomputer, within which are provided an input/output port not shown, A/D converter, read only memory (ROM), and random access memory (RAM). This logic control circuit fetches the peak value and its peak position coordinates of the high-frequency component within one field period based on the output of the bandpass filter 14 output from the peak position detection circuit 17, the object contrast information based on the output of the object decision filter 13, the unfocused width information based on the output of the unfocused width detection circuit 15 and the detection information from each encoder, which were output from the peak position detection circuit 17, and operates them according to a predetermined algorithm, whereby from their time series variations, the settings of a position, size, moving direction and movement response speed of the focusing detection region on a picked-up picture are performed, or the object tracking is carried out, while the moving direction and moving speed of a focusing lens at which the focusing point is obtained are implemented.

That is, the movement of an object is detected for each field, from the peak value and its peak position coordinates of the high-frequency component within one field period based on the output of the bandpass filter 14, a gate pulse is supplied to the gate circuit 16 for the on/off control to set the focusing detection region around a position centered on the changed peak position, i.e., object position, and only a portion of an image signal corresponding to that within the focusing detection region is passed.

The logic control circuit 18 also performs the focusing detection for the object, based on the image signal corresponding to that within the focusing detection region that has been set, thereby adjusting the focusing point. That is, it fetches unfocused width information supplied from the unfocused width detection circuit 15 and peak value information of the high-frequency component supplied from the bandpass filter 14, and supplies control signals, such as a rotational direction, rotational speed, start/stop of rotation for the focusing motor 10, to the focus driving circuit 9, so that the focusing lens 1A should be driven to a position where the unfocused width within one field is minimum and the peak value of the high-frequency component is maximum, thereby controlling the focus driving circuit 9.

In this case, the logic control circuit 18 controls the size, moving range and movement response speed for the focusing detection region, according to the focusing degree, and the depth of field obtained from an iris value and a focal distance detected by the iris encoder 21 and the zoom encoder 20, respectively.

In this way, it is possible to focus on a moving object while performing the automatic tracking thereof.

Here, in the present invention, the use of an unfocused width signal output by the unfocused width detection circuit 15 and a peak value of the high-frequency component output by the bandpass filter 14 for the detection of focusing is based on the following reason.

That is, while the unfocused width has such a characteristic that it provides a high accuracy of the focusing detection near or at a focusing point due to the unsusceptibility to the effect of object contrast, because the unfocused width is smaller near the focusing point and minimum at the focusing point, it can not provide a sufficient accuracy of the focusing detection far off the focusing point, it has a narrow dynamic range.

On the contrary, while the high-frequency component can provide the output corresponding to the focusing degree even far away from the focusing point, because the dynamic range is wide, it can not give as sufficient accuracy for the focusing detection as that of the unfocused width detection, as a whole, due to a large effect of the contrast.

Accordingly, a focusing detection method can be realized with a combination of them, in which the dynamic range is wide and a high detection accuracy can be obtained near the focusing point.

The logic control circuit 18 also gets and detects regularly the contrast within the focusing detection region within a picked-up picture, based on the output of the object decision filter 13, thereby determining whether there is an object within the picked-up picture or not.

That is, if an object image is outside of the picked-up picture, or in a condition where the contrast between the object and the background can hardly be obtained due to an extremely unfocused state, the object decision becomes itself impossible, so that the object can not be tracked precisely, and thus malfunctions are liable to occur and the focal adjustment is performed incorrectly.

In view of the above-mentioned problems, according to this invention, it is determined from the contrast within a picked-up picture whether or not there is an object, and if there is no object, the movement of the focusing detection region, i.e., the object tracking operation, is stopped to avoid malfunctions owing to unnatural movement of the focusing detection region and the false detection of other than an object.

And, according to this invention, a configuration is taken such that by detecting the depth of field in performing the above-mentioned automatic tracking of object, the size, moving direction and response speed of the focusing detection region are controlled, thereby enabling the optimal object tracking operation.

A gate pulse output from the logic control circuit 18, after being subjected to a predetermined signal processing not only via the gate circuit 16 but the display circuit 22, is superimposed onto a television signal output by the process circuit 5, supplied to the monitor 23, where the focusing detection region is superimposed within a monitor screen, and is displayed by lighting or blinking it, depending on the state of focus adjustment.

Next, the control operation of the focusing detection region with an automatic focusing device according to the present invention will be described sequentially with reference to a flowchart shown in FIG. 2. It should be noted that the automatic object tracking operation of this invention can operate in the AF (automatic focusing adjustment) mode, but is made inoperative in the manual focusing adjustment mode, in which the focusing detection region is not displayed onto the monitor screen.

It should be also noted that there are provided in the present invention, the AF mode accompanying the object tracking operation and the normal AF mode not accompanying the object tracking operation, in which the mode during operation can be distinguished with an indication within the monitor screen.

Figure 2A:
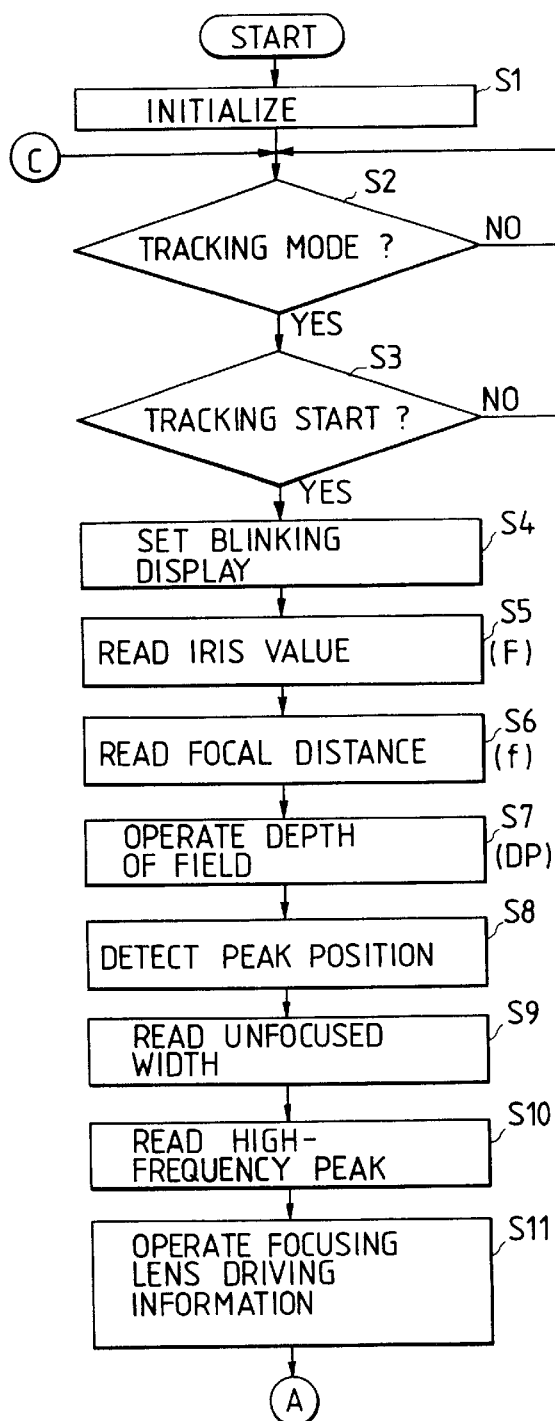
FIG. 2 is a flowchart for explaining the control operation of the pick-up device according to the present invention.
Figure 2:
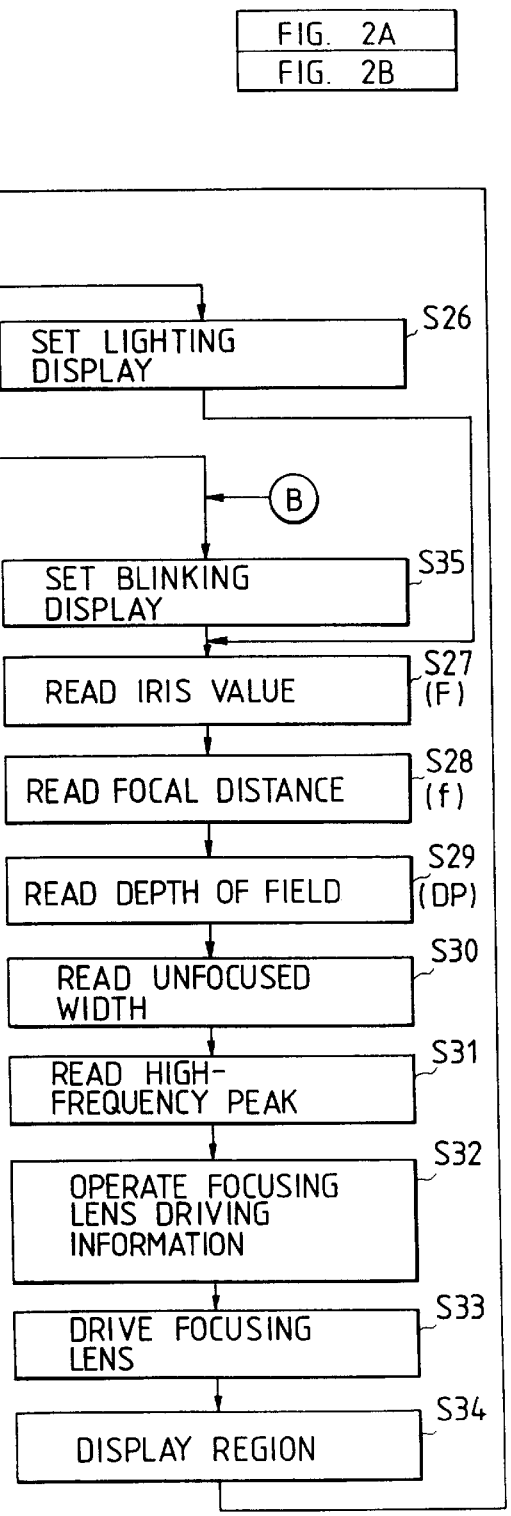

In FIG. 2, the object tracking control flow is started, and then the system is initialized at step S1, in which the focusing detection region is set at an initial position on almost central portion within a predetermined picked-up picture, and its size is set maximum.

Next, at step S2, a determination is made whether the automatic object tracking mode is on or not.

If the tracking mode is off at step S2, the processing proceeds to step S26, in which the setting for displaying by lighting the focusing detection region within the monitor screen is performed while the focusing detection region is left fixed at the initial position of almost central portion on the picked-up picture, and subsequently the AF operation is performed in steps S27–S33. An algorithm of this AF operation is the same as that of the AF operation as shown in steps S5–S12 in the object tracking operation, and therefore it will be described later.

After terminating the flow of the AF operation, the processing proceeds to step S34, in which the focusing detection region is displayed by lighting within the monitor screen according to the setting at step S26, and it returns to step S2. That is, in the normal AF mode not accompanying the object tracking operation, the focusing detection region is displayed by lighting.

If it is determined that the tracking mode has been set at step S2, the processing proceeds to step S3, in which a determination is made whether the tracking operation has been started, or it is in a stand-by state before starting of the tracking operation. If the tracking operation is in the stand-by state, the processing proceeds to step S35, in which the setting for displaying by blinking the focusing detection region within the monitor screen is performed to indicate the stand-by state of tracking, while the focusing detection region remains in the initial position set at step S1. Thereafter the AF operation is carried out at step S27–S33, and then the processing proceeds to step S34, in which the focusing detection region is displayed by blinking within the monitor screen according to the setting at step S26, and it returns to step S2. That is, in the stand-by mode of the object tracking operation, the focusing detection region can be displayed by blinking it within the monitor screen.

If the tracking has been started at step S3, the processing proceeds to step S4, in which the setting for displaying by blinking the focusing detection region within the monitor screen is performed to show the automatic object tracking mode for continuing to focus on a moving object by automatically tracking it on the focusing detection region within the picked-up picture. It should be noted that the display of the object tracking mode can be distinguished from that of the tracking stand-by mode, for example, with different blinking periods.

Entering the automatic object tracking operation, at step S5, an iris value detected by the iris encoder 21 is fetched into the logic control circuit 18 for each field, converted into digital data of for example one byte with the A/D conversion circuit within the logic control section 18, and then read into the memory. At step S6, a digital signal of focal distance information detected by the zoom encoder 20 is fetched into the logic control section 18, and read into the memory for each field.

At step S7, the depth of field is obtained based on the iris value and the focal distance fetched at steps S5 and S6, respectively. This operation of the depth of field is performed with a decision table for the depth of field, as shown in FIG. 3, which has been written into ROM within the logic control circuit 18. In an example of the information table as shown in FIG. 3, the depth of field is determined at one of three stages for the regions DP1, DP2 and DP3, depending on the information of the iris value F and the focal distance f. In the same figure, the depth of field is deeper in the order of DP1, DP2 and DP3.

At step S8, based on the output from the peak position detection circuit 17, the information of horizontal and vertical positions for a peak value of the high-frequency component of a brightness signal within one field period, in a unit of block within the picked-up picture, is read into the logic control circuit 18.

At step S9, the unfocused width information within that field that was output from the unfocused width detection circuit 15, and at step S10, the peak value information within that field that was output from the bandpass filter 14 are read into the memory after the A/D conversion within the logic control circuit 18, respectively. And at step S11, the focusing detection is performed from the information about the depth of field, unfocused width and peak value of the high-frequency component, in order to obtain and determine the drive speed which corresponds to a drive direction and a focusing degree of the focusing lens 1A. In this case, the speed of focusing lens is corrected in view of the depth of field obtained from the iris value and focal distance. In determining the depth of field and the drive speed, the operation time can be shortened and the program simplified, by making use of an information table as shown in FIG. 3 or an information table not shown for setting the speed to determine it from the focusing degree and the depth of field, which is stored in ROM as previously described.

At step S12, the focusing lens drive information (focusing motor drive speed, drive direction, control signal such as drive/stop) is supplied to the focus motor driving circuit 9 to drive the focusing motor 10, thereby moving the focusing lens 1A to the focusing point.

At step S13, the analog contrast information within that field output by the object decision filter 13 is transformed into a digital form with the A/D conversion, which is read into a predetermined memory area within the logic control circuit 18, and at step S14, a predetermined operation is performed to decide the contrast of object. More specifically, by comparing the information of the level of a brightness signal output by the object decision filter 13 with a predetermined threshold, the contrast of object is determined, whereby it is decided whether the automatic tracking with a high precision based on the variations of the peak value of the high-frequency component is possible, or the object tracking is impossible due to a low brightness.

If it is determined at step S14 that the contrast of object is sufficiently high so that the object reliably exists within the focusing detection region, and the object tracking with a high precision is possible, the processing proceeds to steps from S15 on, in which the size, moving direction and response speed of the focusing detection region (also used as the object tracking region) are obtained based on the information of the depth of field obtained at step S7.

That is, at step S15, the depth of field obtained at step S7 is decided, and if it is DP3 that is deepest, the processing proceeds to step S16, in which the size of the focusing detection region is set at maximum and it is fixed centrally within the picked-up picture. Note that the position and size of this focusing detection region may be the same as those for the initial setting region set at step S1, or may be set in other ways.

If the depth of field is DP2 that is medium, the processing proceeds to step S17, in which the size and response speed of the focusing detection region is set at medium and the moving direction is set to be only horizontal.

If the depth of field is DP1 that is shallowest, the processing proceeds to step S18, in which the size and the response speed of the focusing detection region are set at minimum and at maximum, respectively, while the moving direction of the focusing detection region is set to be both horizontal and vertical.

The reason that the size, response speed and moving direction of the focusing detection region are variably controlled based on the depth of field will be explained in detail with reference to FIG. 4.

Figure 4C:
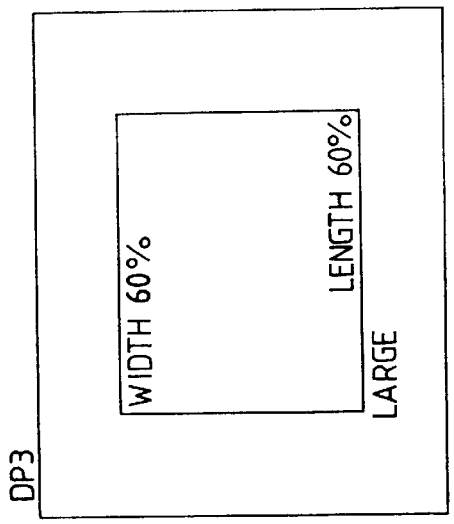
FIGS. 4A to 4C are views showing the positional relations of a focusing detection region within a picked-up picture on the pick-up device according to the present invention.
Figure 4B:
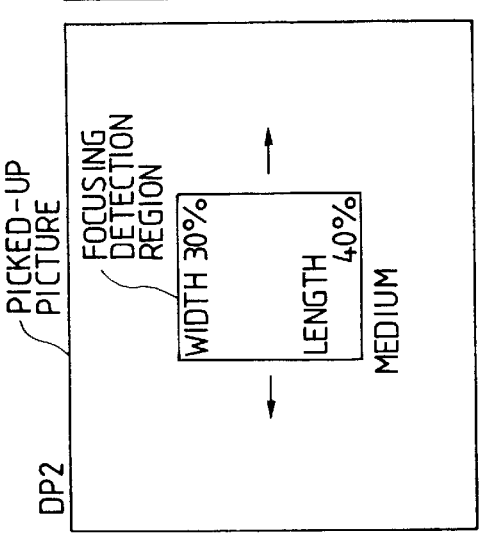
Figure 4A:
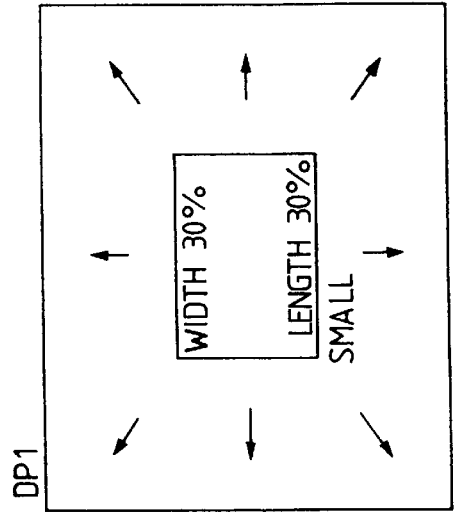

As shown in step S18, when the depth of field is DP1, that is, shallowest, the size of the focusing detection region is set minimum, as shown in FIG. 4A, and more specifically, it is set on a region longitudinally 30% and transversely 30% for the entire screen. And the moving direction is allowed upward and downward, left and right, and diagonally.

As shown in step S17, if the depth of field is DP2, that is, medium, the size of the focusing detection region is set at a medium value longitudinally 40% and transversely 30% for the entire screen, as shown in FIG. 4B, with the moving direction being only horizontal, and the response speed being set at a medium value.

As shown in step S16, if the depth of field is DP3, that is, deepest, the size of the focusing detection region is set at maximum longitudinally 60% and transversely 60% for the entire screen, as shown in FIG. 4C, in which the focusing detection region is fixed.

Generally, when the depth of field is shallow, the focusing degree largely varies between the focusing and unfocusing states in the picked-up picture, resulting in a state where a main object is easily focused on, and can be distinctly distinguished from the background, whereby the high-frequency component from the main object can be correctly detected, and the changes of the high-frequency component due to the drift of the focusing point and the movement of the object can be also precisely detected. Accordingly, as the focusing detection region can catch and track the main object correctly, the size thereof is set minimum. And when the depth of field is shallow, the focal distance is long, and the proportion of the object occupying within the picked-up picture is often large, so that a slight movement thereof appears on the picked-up picture to an larger extent, thereby the response speed of the focusing detection region must be set at a higher speed.

When the depth of field is deep, the focusing more easily occurs at more points on the picked-up picture, irrespectively of the main object, so that the position at the peak point of the high-frequency component of image can not be fixed due to their frequent changes, which makes it difficult to perform the normal tracking operation. In other words, in such a state that the depth of field is so deep as to be likely to focus on an object, the need of tracking the object for the focusing is reduced. When the zoom lens is moved to the wide side to make the depth of field deep, the angle of view becomes wide, so that the movement of object is slower generally and less particularly in the vertical direction. Accordingly, the focusing detection region should be set to be great to avoid malfunctions owing to the far and near contention, and be fixed at the central portion within the picked-up picture.

When the depth of field is medium as above shown at step S17, the size and the response speed of the focusing detection region are set at medium and the moving direction of the focusing detection region is made only in the horizontal direction where most of the movement occurs, since it is an intermediate state between the deep and shallow cases.

In this way, by controlling finely the size, moving direction and response speed of the focusing detection region with the depth of object, unnecessary tracking operation is eliminated, so that a smoother tracking can be implemented.

Here, turning to the flowchart of FIG. 2 again, after the setting condition of the focusing detection region is determined in accordance with a pick-up situation at steps S16, S17 and S18 as above described, the processing proceeds to step S19, in which based on the horizontal and vertical coordinates of a peak point detected position of the high-frequency component within the current field which have been output from the peak position detection circuit 17 and stored in a predetermined memory area within the logic control section 18, and in view of the information about the response speed and moving direction of the focusing detection region which have been obtained at steps S16–S18, the move position at the next field of the focusing detection region centered on the previously indicated peak position can be operated.

In this case, if the setting position of the focusing detection region is determined by averaging the information at a predetermined number of fields in the past, rather than only by the comparison with the information at the previous field, a stabler position setting can be performed without influence such as noise (for example, a method for setting the focusing detection region can be applied, as disclosed in Japanese Patent Application No. 1-213921 filed previously by the present applicant.)

At step S20, the coordinate values of the focusing detection region within the picked-up picture of the next field obtained at the previous step are checked to see in which direction they are changed, compared with the coordinates within the current picked-up picture, and if it is other than a predetermined moving direction, the region moving direction is set not to be that direction.

As step S21, the size of the focusing detection region is set, based on the size of the focusing detection region obtained at previous steps S16–S18.

At step S22, based on the information of the position and size of the focusing detection region set at the above-mentioned flow, a gate pulse is supplied to the gate circuit 16, in order to control the sampling position of a pick-up signal within the picked-up picture, or the setting position of the focusing detection region. Thus, the position and size of the focusing detection region within the picked-up picture can be updated.

This gate pulse is also supplied to the display circuit 22 at the same time, where it is controlled by a control signal from the logic control circuit 18. And at step S23, it is converted into a blinking display signal, which indicates the display of the focusing detection region according to that mode, or the object tracking mode set at step S4, to superimpose it onto the monitor screen 23.

At a stage where the above flow has been executed, one object tracking operation terminates and returns to step S2.

In this way, it is possible to track a moving object automatically, by detecting the movement of the peak detection position.

It should be noted that if it is determined at step S14 as above described that a high precision tracking of an object is impossible due to a low brightness of the object, as a result that the information of an object brightness fetched through the object decision filter 13 is obtained, it means that the object does not exist within the focusing detection region, or it is placed in an extremely unfocused state, whereby the movement of the focusing detection region becomes unstable, or malfunctions may occur, in tracking the object, so that the focusing operation itself becomes difficult. And so the processing proceeds to step S24 to forcefully set the position of the focusing detection region to the reset position, and stop the tracking operation. This reset operation is performed in such a way that the initial position coordinates and the size of the focusing detection position in almost central portion within the picked-up picture set at step S1 are set, and then step S25, a gate pulse corresponding to the reset position is output to the gate circuit 16.

After the reset operation of the focusing detection region is performed when the object tracking is impossible, the processing proceeds to step S35, in which the operation transfers to the object tracking stand-by mode, with the focus detection region displayed within the monitor screen in accordance with that mode, as previously described.

Thus, when the tracking is impossible, malfunctions with the focusing detection region are thereby avoided, and the movement becomes natural.

By repeating the above control flow with field periods, it is possible to perform the automatic tracking of a moving object while focusing thereon.

Figure 5C:
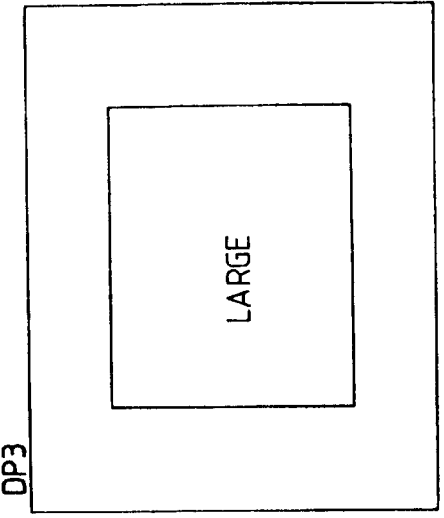
FIGS. 5A to 5C are views for explaining another example of the control of a focusing detection region within a picked-up picture on the pick-up device according to the present invention.
Figure 5B:
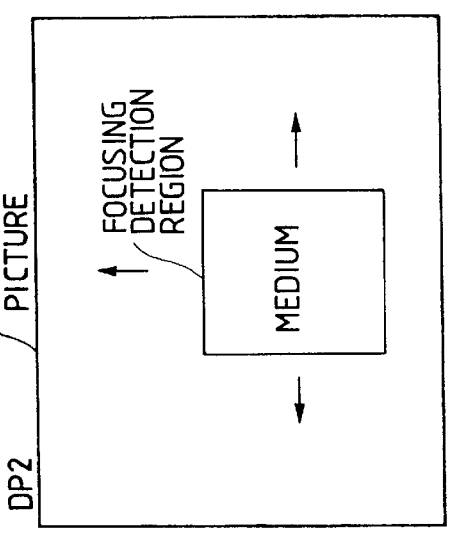
Figure 5A:
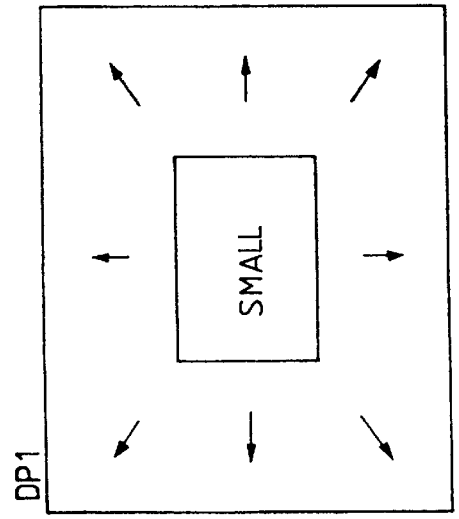

It should be noted that according to the above-mentioned example, when the depth of field is at the medium level, the movement direction for the focusing detection region was made only horizontal, but is not limited to that, and therefore, taking into consideration that the weighting of movement in the vertical direction becomes small, it may be permitted to move in both the horizontal and upper directions, in such a manner as shown in FIGS. 5A–5C. The relationship between FIGS. 5A–5C is the same as that between FIGS. 4A–4C.

In the above-mentioned example, the depth of field is controlled by dividing it into three stages, but the number of stages is not limited to three, and so it is possible to control, for example, at two or five stages. In changing the number of stages, however, the size, movement range and response speed of the focusing detection region must be of course optimized, depending on each depth of field that was divided.

As described above, the pick-up device according to the present invention can continue to focus on a moving object reliably, and perform the stable and precise object tracking without malfunctions such as the far and near contention, because a main object can be always caught within the focusing detection region, irrespectively of the depth of field, by appropriately controlling or switching the size, moving direction and response speed of the focusing detection region within the picked-up picture depending on the depth of field.

As described previously, as automatic focusing device which is constructed to continue to focus on a moving object by the tracking is not at present provided with a feature that it can notify an operator of the information of whether the focusing adjustment is performed in conjunction with the automatic object tracking operation, or it is performed in the normal fixed focusing detection region, so that the operator can not know promptly a current operation state.

Accordingly, the operator can not recognize correctly an object that is currently focused on, even without a notice that an object other than the object to be focused is tracked, so that there is a risk that various malfunctions or misoperations may occur, in cases where the variations of the object can not be tracked, or the automatic tracking mode is not set when a stopped object starts to move, or conversely, the focusing detection is considered to be performed with the focusing detection region fixed, but since the automatic tracking mode has been set, the focusing detection region might follow previous object in changing the object to be focused, thus causing the main object not to be focused correctly.

Even though the detection region is displayed within the monitor screen, a decision is difficult whether or not an object of interest is correctly tracked when the screen is confused, and so effective means to raise the accuracy of the object tracking is desired.

Referring now to the flowchart of FIG. 6 and FIG. 7, a second example in accordance with the present invention will be described to resolve the above mentioned problems.

This example is constructed to provide the display of a focusing state, in addition to the display of the object tracking state in the first example as previously described.

As the circuitry of this example is the same as that shown in FIG. 1, the explanation therefor is omitted. This example is implemented by changing the control algorithm for the logic control section 18.

An overall control operation for the focusing detection region in an automatic focusing device according to this example will be described sequentially with reference to the flowchart shown in FIG. 6.

It should be noted that also in this example, the automatic object tracking operation is performed on the AF (automatic focusing adjustment) mode, while it is placed in an inoperative state on the manual focusing adjustment mode, where the focusing detection region is not displayed onto the monitor screen.

There are provided in this example, the AF mode accompanying the object tracking operation and the normal AF mode not accompanying the object tracking operation, which can be distinguished from each other during operation, with an indication within the monitor screen.

In the same figure, if the object tracking control flow is started, a determination is made at step 101 whether or not the automatic object tracking mode is selected with the pick-up mode changeover switch not shown, and if the automatic tracking mode is not selected, the processing proceeds to step S127, in which the focusing detection region is fixed at a predetermined setting position on the central portion within the picked-up picture by controlling the gate circuit 16, in the same way as in the previous example, and the lighting display of the focus detection region within the monitor screen 23 is set by controlling the display circuit 22.

Next, at step 128, an iris value F is read from the iris encoder 21, and at step 129, a focal distance information f is read from the zoom encoder 20, both of which are fetched into the logic control circuit 18 and stored in RAM not shown.

At step S130, the depth of field DP is obtained from the information of the iris value and focal distance stored in the logic control circuit 18, with such a method as will be described later.

At step S131, an unfocused width information is fetched from the unfocused width detection circuit 15, and at step 132, a peak value of the high-frequency component within an image signal is fetched from the bandpass filter 14, which are stored in RAM within the logic control device 18.

At step S133, the drive direction and the amount of drive for the focusing lens 1A are obtained, with the focusing detection region fixed, and based on the high-frequency component and the unfocused width information which are output from the bandpass filter 14 and the unfocused width detection circuit 15, respectively, as described above, and at step S134, the focusing lens 1A is actually driven according to this information.

After terminating the flow of the AF operation, the processing proceeds to step S135, in which the tracking region is displayed within the monitor screen 23, via the display circuit 22, in accordance with the setting for the lighting display of the tracking (focusing detection) region conducted at step S127. As above described, in the normal automatic focusing adjustment mode not accompanying the object tracking operation, the tracking (focusing detection) region is displayed by lighting within the monitor screen.

At step S101, if the automatic object tracking mode has been set with the pick-up mode changeover switch not shown, the processing proceeds to step S102, in which the setting for the blinking display of the tracking region (also used as the focusing detection region) within the monitor screen is performed, in order to indicate the automatic object tracking mode for continuing to focus on a moving object while automatically tracking it within the picked-up picture.

Entering the automatic object tracking operation, an iris value from the iris encoder 21 and a focal distance information from the zoom encoder 20 are read into the logic control circuit 18 in a field period, at steps S103 and S104, respectively, and then converted into digital data of for example one byte, with the A/D converter within the logic control section 18, which are stored into RAM not shown.

At step S105, the depth of field DP is obtained based on the iris value F and focal distance f fetched into the logic control circuit 18 at steps S103 and S104. This operation for the depth of field is performed with a decision table for the depth of field as shown in FIG. 3, which has been written into ROM within the logic control circuit 18, as in the previous example.

At step S106, from the output of the peak position detection circuit 17, the information of horizontal and vertical positions for a peak value of the high-frequency component of a brightness signal within one field period, in a block unit within the picked-up picture, is read into the logic control circuit 18.

At step S107, the analog contrast information within that field output by the object decision filter 13 is converted into a digital form with the A/D conversion, which is read into a predetermined memory area within the logic control circuit 18, and at step S108, a predetermined operation is performed to determine the contrast of object. Specifically, the information of the brightness signal level output by the object decision filter 13 is compared with a predetermined threshold to determine the contrast of object, and it is determined whether a high precision automatic tracking based on the change of peak value of the high-frequency component is possible, or the object tracking is impossible due to a low brightness.

If it is determined at step S108 that the contrast of object is so high that the object reliably exists within the focusing detection region, and the object tracking with a high precision is possible, the processing proceeds to steps S109 and the following, in which the size, moving direction and response speed of the focusing detection region (object tracking region) are obtained, based on the information of the depth of field DP obtained at step S107.

The processings with the settings of the position, moving direction and size of the focusing detection region in the steps S109–S116 are the same as those for steps S15–S22 in the flowchart of FIG. 2 in the previous example, and so the explanation therefor will be omitted.

Thus, the position and size of the focusing detection region within the picked-up picture are actually updated.

If the settings of position and size of the focusing detection region (tracking region) at steps S109–S116 have been completed, the processing transfers to the display process for displaying the state of tracking operation as shown in steps S117–S120.

That is, in tracking an object automatically, according to this invention, an operator can distinguish between a case where the tracking operation is normally performed by focusing on the object and a case where it is not normally performed due to a large deviation out of the focusing point, with different periods of blinking of display of the focusing detection region (tracking region) within the monitor screen.

Transferring to step S117, a determination is made whether or not the object is located near the focusing point.

Figure 7:
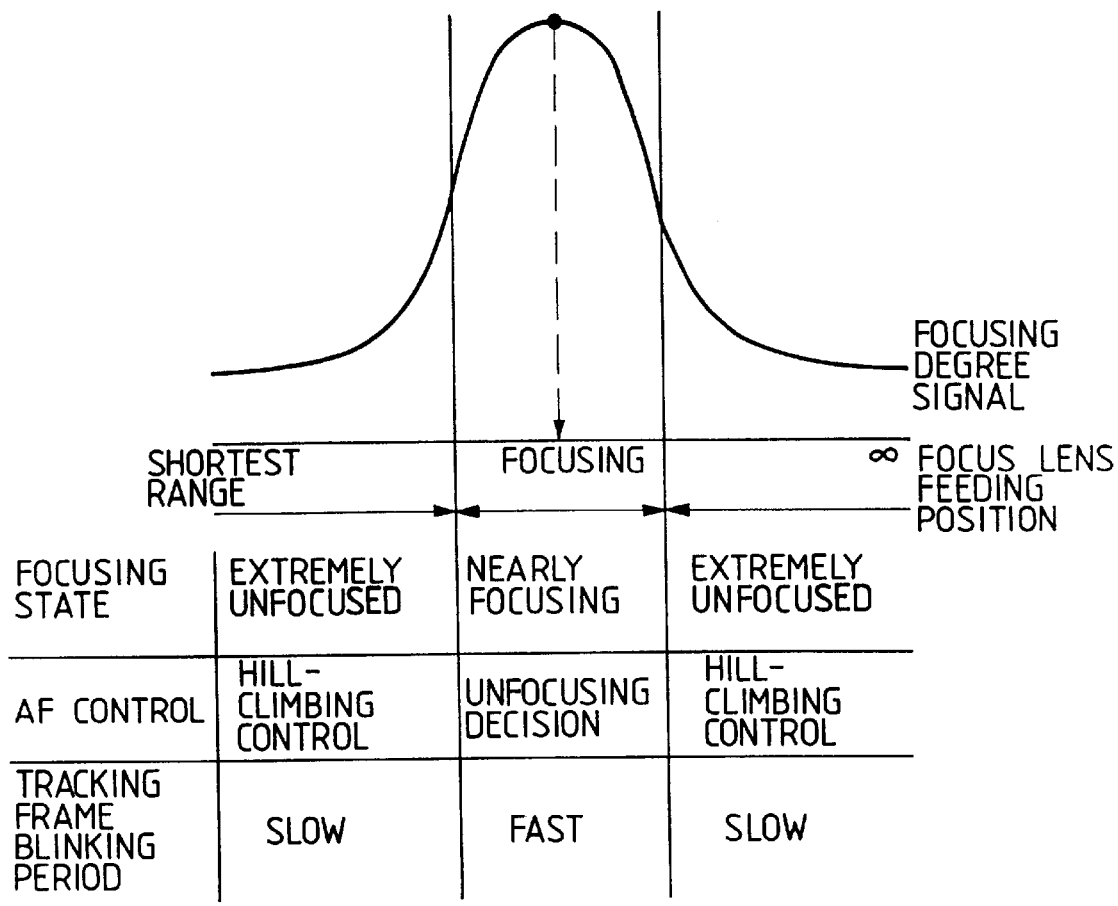
FIG. 7 is a view for explaining the display corresponding to a focusing state on the object tracking mode according to the present invention.

More specifically, from a characteristic curve representing the relation between the focusing lens position and the peak value of high-frequency component or the level of unfocused width information signal changing therewith, as shown in FIG. 7, it is determined whether it is located near the focusing point, whereby the focusing lens 1A is subject to the hill-climbing control in accordance with the characteristic curve when in a state of being off the focusing point, and is stopped at the focusing point, while the decision of unfocusing is made for the restart.

Accordingly, in this example, whether or not the object tracking is normally performed is determined from the focusing state or the controlled state of the focusing lens.

More specifically, when the focusing lens is controlled with the hill-climbing, it is decided that the object tracking is not normally performed, because the object is not yet focused on, or it does not exist within the tracking region.

On the other hand, when the decision of unfocusing is being made, it is a state where the object is currently focused on, and so the normal object tracking is decided.

And as a result of such decision, if the object tracking operation is normally performed, the tracking region blinking period is made fast, while if the object tracking operation is not normally performed, it is made slow.

Thus, it is possible for an operator to always recognize clearly whether the object tracking is normally performed or not, while automatically tracking an object.

Referring to a flowchart with respect to the above operations, at step S117 where the unfocusing decision is performed from the focusing characteristic curve of FIG. 7, if it is determined that the object is located near the focusing point, the processing proceeds to step S118, in which the blinking period of displaying the focusing detection region (tracking region) within the monitor screen is set fast, while if it is determined that the hill-climbing control is performed due to an extremely unfocused state largely off the focusing degree, the processing proceeds to step S119, in which the blinking period of the focusing detection region (tracking region) is set slow.

After completing the setting of the blinking period for the focusing detection region, the processing proceeds to step S120, in which the focusing detection region is displayed within the monitor screen 23, by controlling the display circuit 22, based on the information set at previous steps S110–S112 and the information of the blinking period set at steps S118–S119.

It should be noted that in this example, a decision of whether or not the tracking is normally performed by focusing on an object is made from noting whether or not the focusing lens 1A is controlled with the hill-climbing, or whether the unfocusing decision is performed after the focusing lens 1A has been stopped. But, it is also possible to change the display (blinking period) of the focusing detection region (tracking region), with a method that from the characteristic curve representing the relation between the output level of high-frequency component or unfocused width information and the focusing degree, as shown in FIG. 7, it is decided that the object is located near the focusing point, if that level is above a predetermined level.

With such level decision method, if the level of high-frequency component is only used, that level largely varies with the brightness of an object, and so it is better to perform the unfocusing decision by using the unfocused width information which is not largely subject to the brightness change (the information concerning the width of edge portion of an object image, and as it is normalized with the value of brightness, it is not subject to the effect of brightness change) and presents a high detection sensitivity only near the focusing point.

At step S121, the unfocused width information within that field output from the unfocused width detection circuit 15, and at step S122, the peak value information of high-frequency component within that field output from the bandpass filter 14 are fetched into the logic control circuit 18 in a period of field, respectively, and read into RAM not shown after the A/D conversion within the logic control circuit 18. And at step S123, the focusing detection is performed using the information of the depth of field, unfocused width and peak value of high-frequency component, which were obtained at steps S105, S121 and S122, respectively, to operate and determine the drive speed which corresponds to the drive direction and focusing degree of the focusing lens 1A. In this case, the speed of the focusing lens is corrected in view of the depth of field DP obtained from the iris value F and the focal distance f.

In determining the depth of field and the drive speed, as described previously, the operation time can be shortened and the program simplified, by determining them with reference to an information table as shown in FIG. 3 or an information table not shown for setting the speed to determine the speed from the focusing degree and the depth of field.

If the operation of the focusing lens drive information has been completed, the processing proceeds to step S124, the focusing lens drive information (focusing motor drive speed, drive direction, control signal such as drive/stop) that was operated at step S123 is supplied to the focus motor driving circuit 9 to drive the focusing motor 10, thereby moving the focusing lens 1A to the focusing point.

With the above processings, the control flow of the automatic focusing adjustment operation accompanying the object tracking is completed, the processing returns to step S101, and thereafter this flow is repeated in a period of once per field.

In this way, the automatic tracking of a moving object can be performed by detecting the movement of the peak detection point, and it is possible to catch the object correctly at present and track it while focusing on the object of interest.

It should be also noted in this example that if it is determined at step S108 as above described that a high precision tracking of an object is impossible due to a low brightness of the object, as a result that the information of an object brightness fetched through the object decision filter 13 is operated, it means that the object does not exist within the focusing detection region, or it is placed in such an extremely unfocused state that the decision of object is difficult, whereby it may not only cause malfunctions in tracking the object, but the movement of the focusing detection region becomes unstable, and the focusing operation itself becomes difficult. And so the processing proceeds to step S125 to forcefully set the position of the focusing detection region to the reset position in the central portion within the picked-up picture, and stop the tracking operation. This reset operation is performed by transferring to step S126 with the setting of the initial position coordinates and size of initial state in the almost central portion within the picked-up picture set when starting the tracking at step S101, and outputting a gate pulse corresponding to the reset position to the gate circuit 16.

After the reset operation of the focusing detection region when the object tracking is impossible, the processing proceeds to step S127 to transfer to the normal automatic focusing adjustment mode not accompanying the object tracking operation, in which the focusing adjustment operation is performed using the fixed focusing detection region within the monitor screen. And the lighting display for the fixed focusing detection region appears within the screen of the monitor 23, and makes it possible for an operator to recognize that the focusing adjustment mode has been switched.

Thus, the above operation can prevent malfunctions of the focusing detection region and make the movement natural, when the tracking is impossible, thereby allowing an operator to recognize the current pick-up situation.

It should be noted that though it is determined in this example whether the tracking operation is normal or not depending the focusing control state, in this embodiment, it is also possible to determine whether the tracking operation is normal or not from the output of the object decision filter 13, as a previous stage for stopping the tracking operation, and display it. That is, if the output level of the object decision filter 13 is high, it is determined that the object tracking is normally performed because the contrast of picture is sufficiently obtained, while when it is below a predetermined level, it is determined that a probability that the tracking operation is correctly performed is low, whereby the blinking display period for the tracking region is changed, as previously described. Further, if the output level of the object decision filter 13 is lowered, the tracking operation itself is stopped as shown in the above-mentioned flowchart.

Such a configuration makes it possible to recognize the pick-up state more precisely.

By repeating the above control flow with field periods, it is possible to perform the automatic tracking of a moving object while focusing thereon.

It should be noted that in the above-mentioned example, ON/OFF indication of the object tracking operation relies on the lighting or blinking of the focusing detection region, but is not limited to it, the display with a color, for example, rather than blinking, is also possible, while together with the display of the focusing detection region, the pick-up mode may be separately displayed within a screen of electronic view finder.

Also in this example, in setting the focusing detection region, when the depth of field is at the medium level, the movement range for the focusing detection region is set only horizontal, but is not limited to it, and taking into consideration that the weighting of movement in the vertical direction becomes small, it may be permitted to move in both the horizontal and upper directions, as shown in FIGS. 5A–5C. Note that the corresponding relation of each figure is the same as that in FIGS. 4A–4C.

The number of stages for switching the depth of object is not restricted, or it is possible to control it at five or two stages, for example, in changing the number of stages, however, the size, movement range and response speed of the focusing detection region must be of course optimized, depending on each depth of field that was divided, in the same way as the previous example.

According to this example, the region for tracking an object and the focusing detection region for detecting the focusing state of the object are constructed to be the same area, but these regions can be provided differently so that the object position is tracked with the object tracking region, where the focusing detection region is set separately, thereby enabling the size of each region to be set individually.

As described above, an automatic focusing device according to the present invention can perform a stable and precise tracking of an object, by setting a first focusing detection mode in which the focusing operation is performed by fixing the focusing detection region at a predetermined position on the previously described picked-up picture, or a second focusing detection mode in which the focusing operation is performed while tracking the object with the previously described detection region, wherein it can display the previously described focusing detection region within a monitor screen, and further distinctly display within the monitor screen in which mode the current focusing detection is placed, i.e., the ON/OFF status of the automatic object tracking operation, as the above-mentioned first and second detection modes are configured to have different displays of the focusing detection region, so that an operator can recognize a current pick-up state correctly, and thus various malfunctions and misoperations can be prevented.

Furthermore, an automatic focusing device with the automatic object tracking feature according to the present invention can distinctly display within a monitor screen a state where the object tracking is normally performed to continue to focus on a moving object, or a state where the object tracking is not performed normally so that the focusing state can not be obtained on the object to be tracked, as it is configured to display whether or not the object tracking operation is normally performed, with a decision from a condition of the focusing control system, whereby an operator can recognize the current pick-up condition correctly, and various malfunctions and misoperations can be prevented.

What is claimed is:

1. A movement correcting apparatus comprising:

movement detecting means for detecting a movement of an image in an image screen from an input image signal;

shifting means for shifting a read-out area within the image screen for reading a predetermined image signal so as to trace a movement of the image, on the basis of an output of said movement detecting means; and control means for changing a shiftable range in the image screen of said read-out area on the basis of a focal length.

2. An apparatus according to claim 1, wherein said control means changes a size of said read-out range according to the focal length.

3. The apparatus according to claim 1, wherein said read-out range is an object tracking area for extracting a predetermined image signal component corresponding to a feature of the image.

4. The apparatus according to claim 1, wherein said read out range is a focus detecting area for detecting a focus state of the image.

5. The apparatus according to claim 1, wherein said control means limits moving direction of said read-out range and moving distance in said image screen.

6. A movement correcting method comprising:

a movement detecting step of detecting a movement of an image in an image screen from an input image signal;

a shifting step of shifting a read-out area within the image screen for reading a predetermined image signal so as to trace a movement of the image, on the basis of an output signal generated in said movement detecting step; and a controlling step of changing a shiftable range in the image screen of said read-out area on the basis of a focal length.

7. The method according to claim 6, wherein said controlling step includes a step of changing a size of said read-out range according to the focal length.

8. The method according to claim 6, wherein said read-out range is an object tracking area for extracting a predetermined image signal component corresponding to a feature of the image.

9. The method according to claim 6, wherein said read-out range is a focus detecting area for detecting a focus state of the image.

10. The method according to claim 6, wherein said control step includes a step of limiting moving direction of said read-out range and moving distance in said image screen.

11. An image sensing apparatus comprising:

movement detecting means for detecting a movement of an object image in an image screen from an image signal;

area setting means for moving an image read-out area in the image screen for reading a predetermined image signal so as to trace the movement of the object image, on the basis of an output of said movement detecting means;

control means for changing a movable range in the image screen of said read-out area on the basis of a focal length; and display means for displaying an image in said read-out area.

12. The apparatus according to claim 11, wherein said read-out range is an object tracking area for extracting a predetermined image signal component corresponding to a feature of the image.

13. The apparatus according to claim 11, wherein said read-out range is a focus detecting area for detecting a focus state of the image.

14. The apparatus according to claim 11, wherein said control means limits moving direction of said read-out range and moving distance in said image screen.

15. A movement correcting apparatus comprising:

movement detecting means for detecting a movement of an image in an image screen from an input image signal;

shifting means for shifting a read-out area within the image screen for reading a predetermined image signal so as to trace a movement of the image, on the basis of an output of said movement detecting means; and control means for changing a shiftable range in the image screen of said read-out area on the basis of a zooming magnification.

16. An apparatus according to claim 15, wherein said control means changes a size of said read-out range according to the focal length.

17. The apparatus according to claim 15, wherein said read out range is an object tracking area for extracting a predetermined image signal component corresponding to a feature of the image.

18. The apparatus according to claim 15, wherein said read-out range is a focus detecting area for detecting a focus state of the image.

19. The apparatus according to claim 15, wherein said control means limits moving direction of said read-out range and, moving distance in said image screen.

20. A movement correcting method comprising:

a movement detecting step of detecting a movement of an image in an image screen from an input image signal;

a shifting step of shifting a read-out area within the image screen for reading a predetermined image signal so as to trace a movement of the image, on the basis of an output signal generated in said movement detecting step; and a controlling step of changing a shiftable range in the image screen of said read-out area on the basis of a zooming magnification.

21. The method according to claim 20, wherein said controlling step includes a step of changing a size of said read-out range according to the focal length.

22. The method according to claim 20, wherein said read-out range is an object tracking area for extracting a predetermined image signal component corresponding to a feature of the image.

23. The method according to claim 20, wherein said read-out range is a focus detecting area for detecting a focus state of the image.

24. The method according to claim 20, wherein said control step includes a step of limiting moving direction of said read-out range and moving a distance in said image screen.

* * * * *

UNITED STATES PATENT AND TRADEMARK OFFICE
CERTIFICATE OF CORRECTION

PATENT NO.       : 6,417,883 B1
DATED            : July 9, 2002
INVENTOR(S)      : Kitahiro Kaneda It is certified that error appears in the above-identified patent and that said Letters Patent is hereby corrected as shown below:

<u>Title page,</u>
Item [63], Related U.S. Application Data, delete "Jan. 5, 1991," and insert
-- Feb. 5, 1991, --.

Signed and Sealed this

Twentieth Day of May, 2003

JAMES E. ROGAN
*Director of the United States Patent and Trademark Office*